Figure 1:
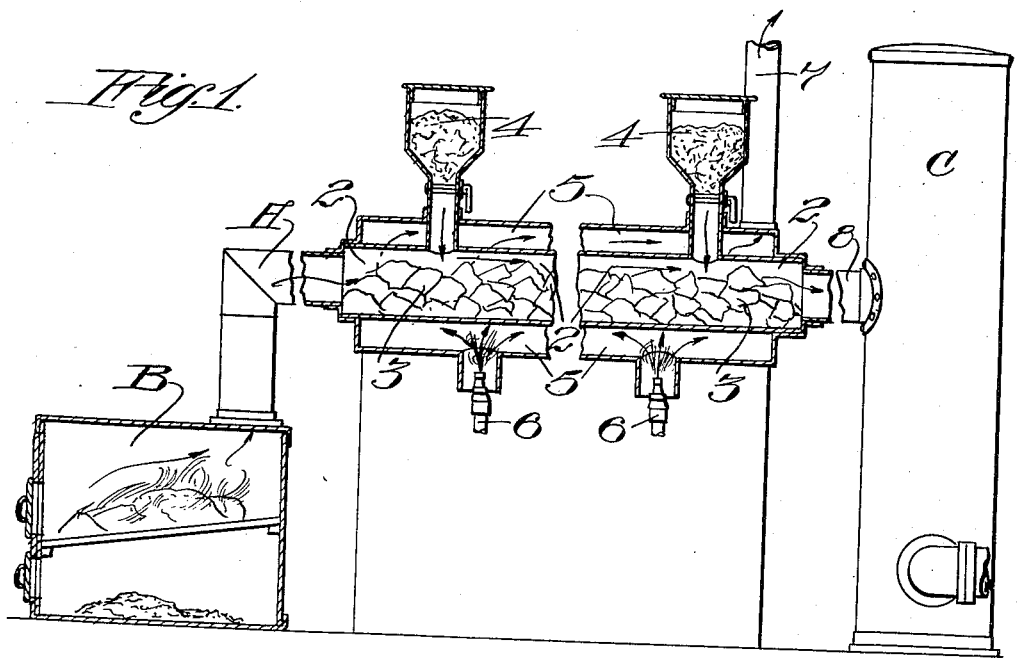

S. W. YOUNG.
FUME DESTROYING PROCESS.
APPLICATION FILED AUG. 15, 1911.

1,094,767.

Patented Apr. 28, 1914.

Witnesses
Thos. Castberg
F. E. Maynard

Inventor
Stewart W. Young
by G. H. Strong
his Atty

UNITED STATES PATENT OFFICE.

STEWART W. YOUNG, OF PALO ALTO, CALIFORNIA, ASSIGNOR, BY DIRECT AND MESNE ASSIGNMENTS, TO THE THIOGEN COMPANY, OF SAN FRANCISCO, CALIFORNIA, A CORPORATION OF DELAWARE.

FUME-DESTROYING PROCESS.

1,094,767.      Specification of Letters Patent.     Patented Apr. 28, 1914.

Application filed August 15, 1911. Serial No. 644,156.

*To all whom it may concern:*

Be it known that I, STEWART W. YOUNG, a citizen of the United States, residing at Palo Alto, in the county of San Mateo and State of California, have invented new and useful Improvements in Fume-Destroying Processes, of which the following is a specification.

My process depends upon the fact that when gases or fumes which contain sulfur dioxid are passed over heated coke, coal, charcoal, or any other form of carbon in the presence of a suitable material capable of combining with the sulfur dioxid, or are mixed with the vapor of petroleum, asphalt, bitumen, natural gas or any other hydrocarbon compound or mixture at a high temperature in the presence of a suitable material, as above, which is capable of combining with the sulfur dioxid, there takes place a series of re-actions which result in a complete reduction of the sulfur dioxid to sulfur. If coke or any other form of solid carbon is used, there is produced in addition to the sulfur the chemically equivalent quantity of carbon dioxid. If a hydrocarbon compound or mixture is used, there is produced in addition to the sulfur, a quantity of carbon dioxid chemically equivalent to the carbon contained in the hydrocarbon used, and a quantity of water vapor equivalent to the hydrogen contained in the hydrocarbon used. If the sulfurous gases or fumes which are to be treated contain free oxygen, additional quantities of carbon dioxid and water vapor chemically equivalent to the free oxygen carried will be produced. I also find that in all cases the decomposition or reduction of the sulfur dioxid, and consequently the formation of sulfur, is accelerated by the presence of lime, lime rock or any other sufficiently basic material. In case solid carbon, such as coke or coal is used, granulated lime or other basic material may be mixed with it. In case a hydrocarbon compound or mixture, such as petroleum, is used, the vapors of the hydrocarbon mixed with the sulfurous gases or fumes may be passed over or through the heated lime or other basic material in the granulated, briqueted or other convenient form.

The action of the lime or other basic material in accelerating the above described reaction is explained as follows, assuming that lime is the particular basic substance used: 1. A portion of the sulfur dioxid coming in contact with the lime is absorbed by it, producing calcium sulfite. 2. The carbon or the hydrocarbon vapors then react with this calcium sulfite and convert it into calcium sulfid. 3. A second portion of the sulfur dioxid, coming into contact with this calcium sulfid, reconverts it into calcium sulfite, while at the same time a quantity of sulfur is generated in the free state. Thus the basic material used acts as a "carrier" for the reaction, and so long as the proper proportions of sulfur dioxid and carbon or hydrocarbon are maintained, it does not lose its activity. It is also a matter of indifference whether in starting operations lime, lime rock, calcium sulfid, calcium sulfite, or calcium sulfate is used, since when the system has settled down, the action will be a cyclical one of alternating conversion of sulfite to sulfid and vice versa. The process thus becomes a continuous one, the two re-actions going on continuously and concurrently.

By "basic material" I mean any suitable substance which has the quality of chemically neutralizing the acid properties of sulfur dioxid by the formation of a sulfite, and this formation may be temporary or it may be permanent. Here the formation is temporary, alternating with the formation of the sulfid, as a result of the reducing action of the carbonaceous fuel. The activity of the basic material used may also be increased by the addition to it of small quantities of oxids or salts of iron, copper, manganese and many other metals, which act as so-called "catalytic" accelerators; the action of these catalytic accelerators greatly increases the rapidity of re-action, and prevents the formation of organic sulfur compounds which have an offensive odor. A temperature of 700° centigrade is a suitable one for the reaction, but this temperature may be varied within fairly wide limits without unfavorably affecting the results.

The drawings show practical devices for the operation of my process, in which—

Figure 2:
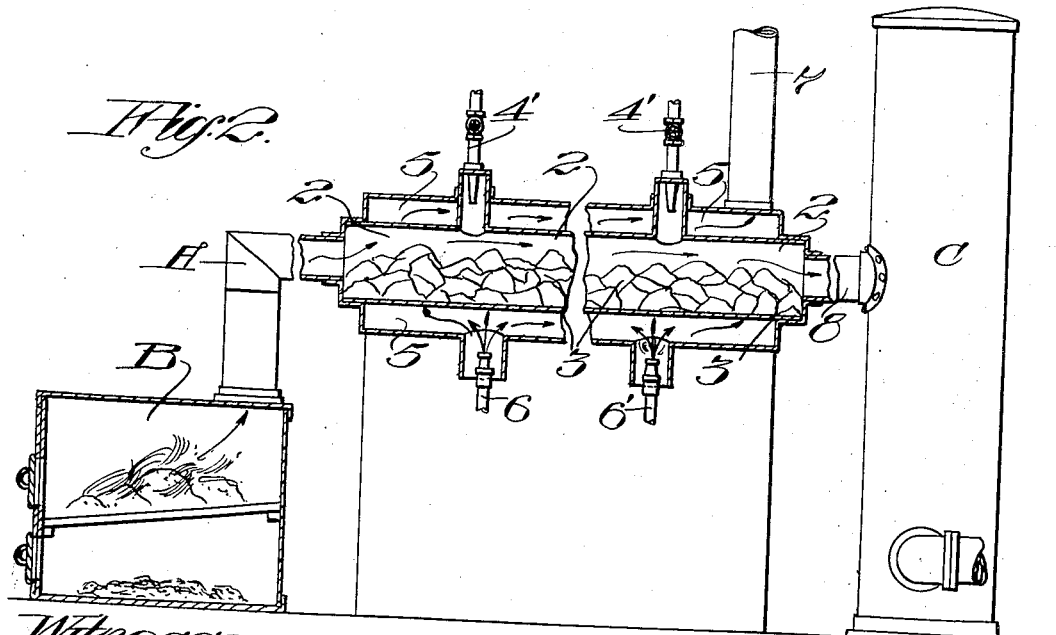

Figure 1 illustrates the use of coke, coal or other form of solid carbon. Fig. 2 illustrates the use of a liquid or gaseous hydrocarbon.

Referring to Fig. 1, the gases or fumes containing sulfur dioxid are admitted through the flue A from the furnace B into the chamber 2, which is charged with lime or other basic carrier 3, in the granulated, briqueted or other convenient form. The coke or other form of solid carbon is admitted from the air-tight hoppers 4—4, or it may be mixed with the lime before starting operations. The chamber 2 is surrounded by a jacket 5 and the chamber 2 and its contents are heated by fuel oil burners 6—6, or other suitable means. The burnt fuel gases escape at the flue 7. The sulfurous fumes or gases in passing through the chamber 2 come into contact with the mixture of basic material and carbon, and the above described reaction occurs. The resulting mixture of carbon dioxid and sulfur vapor passes through the flue 8 to the condenser C, where free sulfur is deposited.

Fig. 2 shows a practical device for the operation of my process in case petroleum, natural gas or other hydrocarbon compound or mixture is used.

The gases or fumes containing sulfur dioxid are admitted through the flue A from the ore roasting furnace B into the chamber 2, which is charged with lime or other basic carrier 3 in the granulated, briqueted or other convenient form. The petroleum or other hydrocarbon compound or mixture is introduced through the injectors 4'—4'. The chamber 2 is surrounded by a jacket 5 and chamber 2 and its contents are heated by fuel oil burners 6—6, or other suitable means. The burnt fuel gases escape at the flue 7. The sulfurous fumes or gases mixed with the hydrocarbon vapors begin to undergo the above described reaction which is accelerated by coming in contact with the basic material which acts as a carrier. The resulting mixture of sulfur, carbon dioxid and water vapor escapes through the flue and may be disposed of in any desired manner.

The two methods, whether a solid carbon fuel or a liquid or gaseous carbonaceous fuel is used, are deemed to be equivalent.

Having thus described my invention, what I claim and desire to secure by Letters Patent is—

1. A method of treating sulfurous fumes to remove the sulfur dioxid and to produce free sulfur therefrom, which consists in subjecting the sulfurous fumes to the action of a heated carbonaceous fuel, in the presence of a calcareous substance with which the sulfur dioxid will react, and then cooling the fumes to a temperature at which the sulfur formed will not recombine with oxygen.

2. A method of treating sulfurous fumes to remove the sulfur dioxid and to produce free sulfur therefrom, which consists in subjecting the sulfurous fumes to the action of a heated carbonaceous fuel, in the presence of a solid reagent capable of neutralizing the sulfur dioxid, and then cooling the fumes to a temperature at which the sulfur formed will not recombine with oxygen.

3. The method of treating sulfurous fumes to eliminate the sulfur dioxid, and to produce free sulfur therefrom, which consists in subjecting the sulfurous fumes to the action of a highly heated hydrocarbon fuel in the presence of a reagent, which has the property of neutralizing the sulfurous acid of the fumes, and then cooling the fumes to a temperature at which the sulfur formed will not recombine with oxygen.

4. A process of decomposing sulfur dioxid which consists in passing the fumes through a heated space, mixed with a highly heated carbonaceous material in the presence of lime rock, and then cooling the fumes to a temperature at which the sulfur formed will not recombine with oxygen.

5. A process whereby sulfur dioxid is eliminated from sulfurous fumes which consists in passing the fumes through a heated space, mixed with a highly heated carbonaceous material in the presence of lime rock, to which a suitable catalytic accelerator has been added, and then cooling the fumes to a temperature at which the sulfur formed will not recombine with oxygen.

In testimony whereof I have hereunto set my hand in the presence of two subscribing witnesses.

STEWART W. YOUNG.

Witnesses:
CHARLES EDELMAN,
C. C. COOK.